Dec. 1, 1936.  L. T. PRITCHARD  2,062,930
DRIVING MECHANISM
Filed Jan. 5, 1934  3 Sheets-Sheet 2
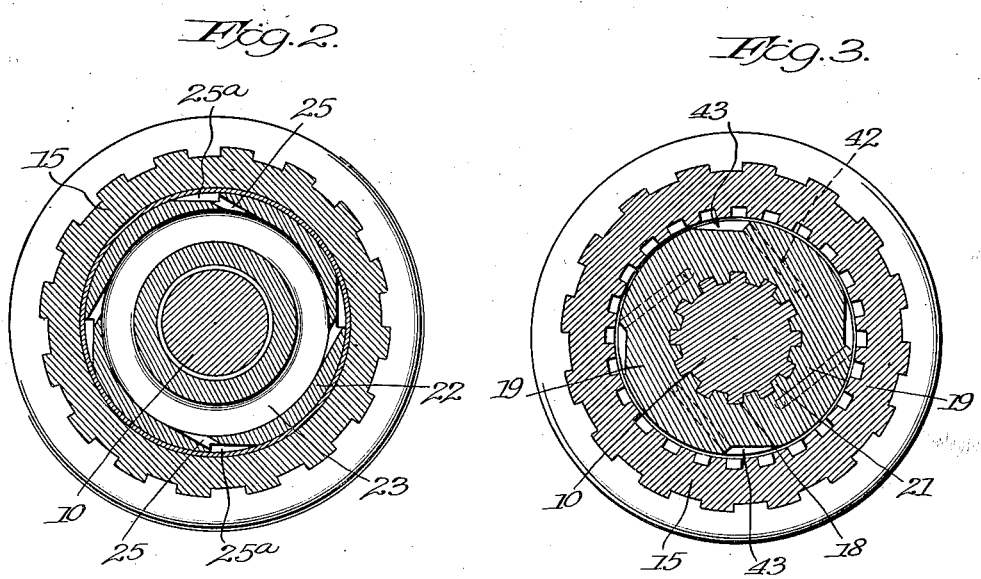
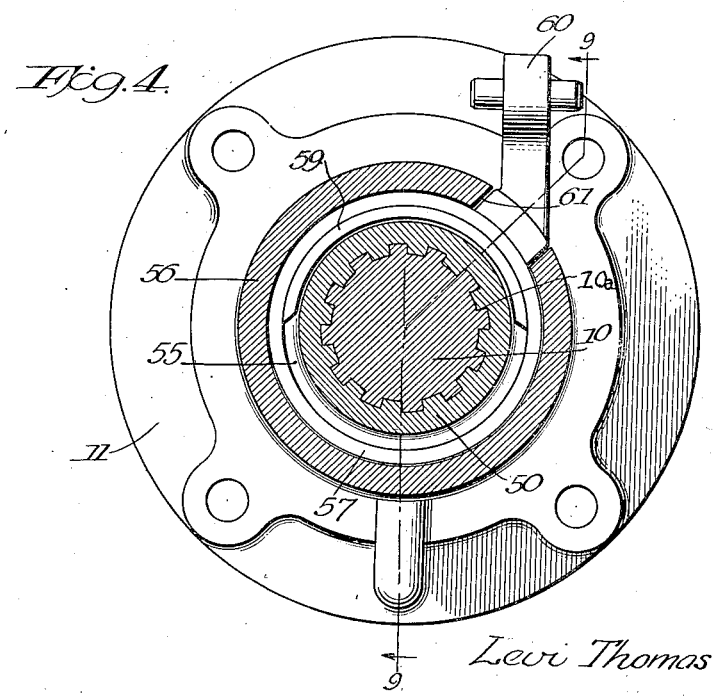
Inventor
Levi Thomas Pritchard.
By Cushman, Darby, & Cushman
Attorneys Dec. 1, 1936.  L. T. PRITCHARD  2,062,930
DRIVING MECHANISM
Filed Jan. 5, 1934  3 Sheets-Sheet 3
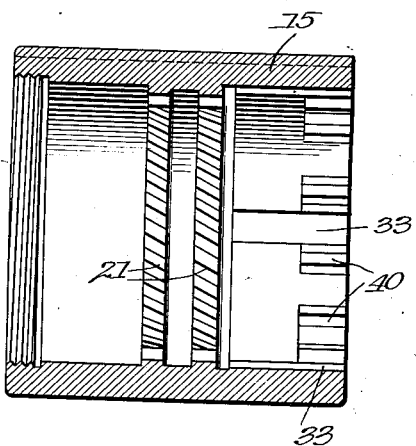
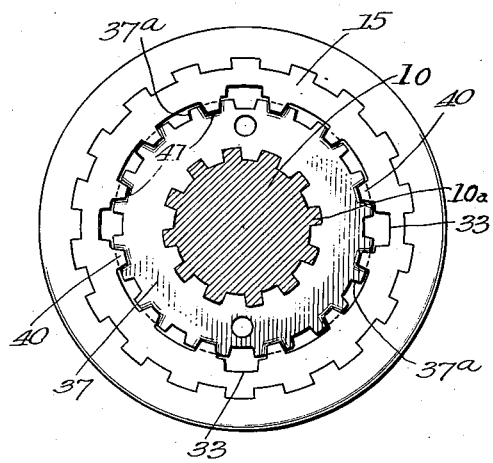
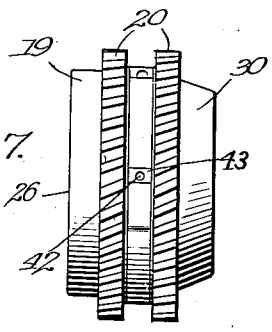
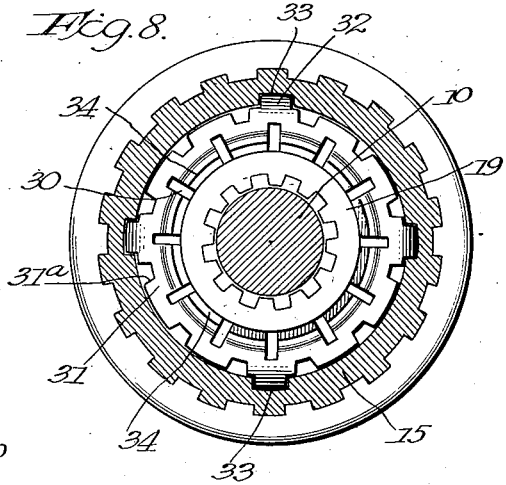
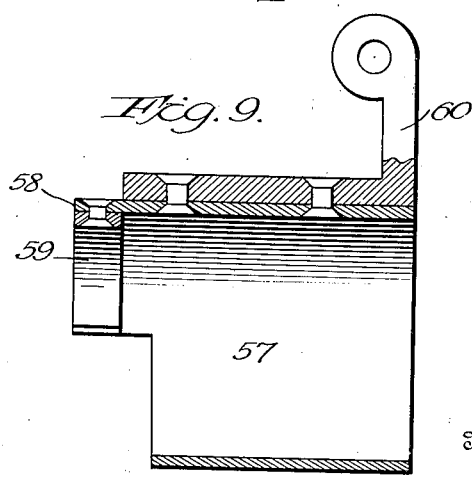
Inventor
Levi Thomas Pritchard
By Cushman, Darby & Cushman
Attorneys Patented Dec. 1, 1936

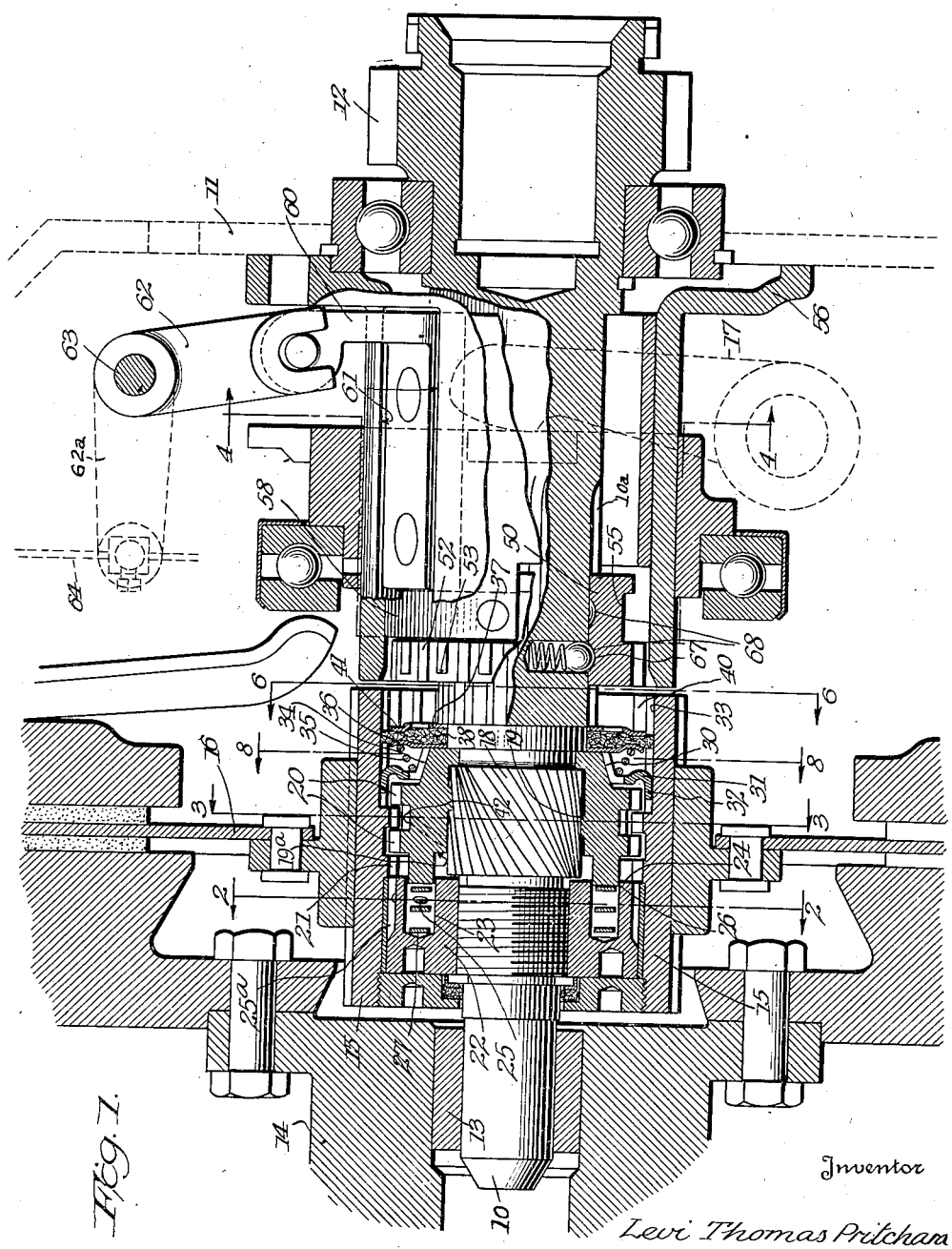

2,062,930

UNITED STATES PATENT OFFICE 2,062,930

DRIVING MECHANISM

Levi Thomas Pritchard, Tulsa, Okla.

Application January 5, 1934, Serial No. 705,415

13 Claims. (Cl. 192—48)

The present invention relates to improvements in a driving mechanism and, more particularly, an overrunning or free wheeling driving mechanism. In the present embodiment of the invention, it is shown applied to an automobile drive. However, it will be understood that the invention may be applied to any mechanism wherein an overrunning connection is desired.

The mechanism provided upon motor vehicles to permit overrunning or free wheeling driving is ordinarily constructed to provide a frictional engagement of the driving and driven shafts or members when the mechanism is in ordinary or nonfree wheeling driving connection. Various mechanisms for permitting the driving member to be positively connected to the driven member when the two members are in driving relation have heretofore been proposed, but none of these devices has been practical, primarily because it has been necessary for the driving and driven members thereof to rotate through a considerable portion of a complete revolution with respect to each other in order to connect or disconnect the same.

The principal object of the present invention is to provide an overrunning driving mechanism arranged to permit the driving member to be disconnected from the driven member when the speed of the driven member exceeds that of the driving member and adapted to positively connect the driven member to the driving member when the speed of the driving member corresponds to or is greater than the speed of the driven member and with a minimum amount of relative rotation between the two members to move a connecting member to or from driving engagement between the driving and driven members.

Another important object of the invention is to provide a mechanism of the type described above wherein means is provided to cushion the movement of the connecting member to engaging position by hydraulic means, the hydraulically operated means being particularly constructed to contain a full supply of cushioning fluid during the operation of the mechanism.

Still another object of the invention is to provide a mechanism of the type described which is so constructed that it may be readily incorporated into the driving mechanisms of motor vehicles provided with a drive of the usual type. The relatively small size and the particular construction of my invention, enables it to be installed in a standard clutch plate hub. The fact that my device is not of the friction type drive and therefore has no overrun drag, makes it particularly adapted to be assembled in the clutch mechanism. This installation eliminates the necessity of an extended housing on the rear of the transmission, thereby permitting a straighter line drive to the differential and eliminating the necessity of a lockout mechanism for reverse drive.

It is a further object of the invention to provide means, disposed entirely within the space occupied by the standard clutch throw-out sleeve, for rendering the overrunning clutch or free wheeling device inoperative.

Another important object of the invention is to provide a mechanism of the type described which may be very readily and economically manufactured and assembled.

Other objects and advantages of the invention will be apparent from the following specification and accompanying drawings, wherein:

Figure 1 is a view partly in central longitudinal section of a motor vehicle driving mechanism embodying the invention;

Figure 2 is a vertical sectional view taken on the line 2—2 of Figure 1;

Figure 3 is a vertical sectional view taken on the line 3—3 of Figure 1;

Figure 4 is a vertical sectional view taken on the line 4—4 of Figure 1;

Figure 5 is a vertical longitudinal sectional view through the clutch hub used in the present embodiment of the invention;

Figure 6 is a vertical sectional view taken on the line 6—6 of Figure 1;

Figure 7 is a view of the connecting member used in the present invention;

Figure 8 is a vertical sectional view taken on the line 8—8 of Figure 1; and

Figure 9 is a detail view of one of the elements of the structure of my invention taken on the line 9—9 of Figure 4.

In the drawings, my invention is shown applied to the driving mechanism of a motor vehicle. With the description of the application of the invention to a motor vehicle which is hereinafter set forth, the mode of application of the invention to other forms of driving mechanism will be entirely apparent.

The numeral 10 designates a transmission drive pinion shaft which will be referred to in the present description as the driven shaft or element. In accordance with the usual practice, the shaft 10 extends into a clutch casing 11 and carries a transmission drive pinion 12 at its outer end exteriorly of the casing. The inner end of the shaft 10 is mounted in the usual transmission drive pinion pilot bushing 13 of a crank shaft 14.

A clutch hub or rotatable element 15 is freely mounted for rotation on the inner end of the shaft 10, the web 16 of the clutch plate extending outwardly from the hub 15. The clutch of which the clutch hub and web form a part is adapted to be actuated in the well known manner by means of a clutch operating fork 17.

The shaft 10 is provided within the clutch hub 15 with spirally extending teeth or threads 18 upon which is mounted a drive connecting member or nut 19 provided on its interior surface with grooves to engage the teeth 18. The outer surface of the connecting member or nut 19 is provided with two sets of axially spaced annular rows of teeth 20. The inner surface of the clutch hub 15 is also provided with two axially spaced annular rows of teeth 21 with which the teeth 20 on the nut 19 are intended to engage when the mechanism is in driving connection. The teeth 20 and 21 on the connecting member 19 and the clutch hub 15, respectively, extend substantially parallel to the teeth or threads 18 on the shaft 10, but are arranged at a somewhat different angle than the latter teeth. For example, the teeth or threads 18 on the shaft 10 may be spiralled at an angle of approximately thirty degrees while the teeth on the outer surface of the connecting member 19 and the teeth upon the cluch hub 15 may be spiralled at an angle of approximately twenty-five degrees.

As is shown in Figure 1, the teeth 20 on the connecting member 19 and the teeth 21 on the clutch hub 15 are so arranged with respect to each other that when the teeth of the connecting member are disengaged from those of the clutch hub, the respective rows of teeth will be axially staggered, with the result that the connecting member need move but a relatively short distance to place the teeth thereof in full engagement with the teeth of the clutch hub.

It will be understood that, if desirable, the number of rows of axially spaced teeth provided on the respective members may be increased in order to increase the contacting surface area of the teeth or to further expedite their engaging movement. In some instances, it may only be necessary to provide a single row of teeth upon each of the engaging elements. However, such an arrangement will slightly prolong the engaging movement of the teeth. Nevertheless, even if such a structure is provided, the provision of the spiralled teeth 20 and 21 will, as is hereinafter explained, enable the teeth to be more quickly engaged than is the case in the usual device of this type.

In order to cushion the extreme inward movement of the connecting member 19, that is, its movement to the left in Figure 1 of the drawings, a hydraulic cushioning means is provided. This means comprises an abutment nut 22 threadedly connected to the shaft 10 and provided with an annular groove or chamber 23 opening to its outer face 24. Ports 25 extend from the annular groove 23 to the peripheral surface of the nut 22 and may there open into pockets 25a, as shown in Figure 2. The ports and pockets are arranged at such an angle that rotation of the shaft 10 and nut 22 will cause oil to be forced from the interior of the clutch hub 15, through the ports 25, into the annular groove or chamber 23. An annular projection 26 is provided upon the inner end of the connecting member 19 in alignment with the annular groove 23 of the nut 22. By this arrangement, the movement of the connecting member 19 to the left, in Figure 1, will cause the projection 26 to move into the groove 23. Since the ports 25 are located adjacent the outer end of the groove 23, inward movement of the projection 26 will cause these ports to be closed, preventing egress of oil from the groove except past the relatively close clearance between the walls of the projection and the walls of the groove. In order to furnish an additional cushioning means, a coil spring 27 may be provided in the groove 23, although such a spring is not usually necessary.

The outer end of the connecting member or nut 19 is tapered as indicated at 30. A friction drag washer or ring 31, shown in detail in Figure 8, is provided to bear upon the tapered surface 30. The friction drag ring 31 is preferably formed of metal and has radially extending bent ears 32 upon its periphery, which ears engage in longitudinally extending grooves 33 provided on the inner surface of the clutch hub 15, causing it to rotate with said clutch hub. A plurality of spring fingers 34, bent to generally conform to the outline of the tapered surface 30 of the connecting member 19, extend inwardly from the ring 31 in order to hold the same as closely as possible in contact with the tapered surface 30 of the connecting member 19. A coil spring 35 is positioned behind the ring 31 with its inner end bearing upon the ring 31 and its outer end in engagement with a metal washer 36. A second metal washer 37 is spaced from the washer 36, with an oil packing washer 38 of suitable material interposed between the two metal washers.

An annular row 40 of teeth is provided upon the inner surface of the hub 15 at the outer end thereof and for a purpose subsequently explained.

In order to enable the friction drag washer or ring 31 to be inserted past the row of teeth 40, the periphery of the ring 31 is provided with notches 31a which are provided to slip past the row of teeth 40. The metal washer 36 is preferably provided with similar notches in its peripheral edge. The outer metal washer 37 is, as shown in Figure 6, provided with notches 37a to permit it to be inserted past the row of teeth 40. The notches 37a are spaced apart a distance equal to that of the spacing between the teeth in the row 40 and equi-distantly spaced between each pair of these notches, is a recess or depression 41. When the ring 37 has been inserted past the row of teeth 40, it is given a slight turning movement against the action of the spring 35 to bring the recesses 41 into alignment with or against the inner ends of the teeth 40. The spring 35 will then exert sufficient pressure, through the washer 36 and packing 38, to hold the recesses 41 of the ring 37 engaged against the inner ends of the teeth 40 to hold the washer 37 in proper position and cause the entire packing structure to be held in proper lateral alignment and to turn with the hub 15.

As is shown in Figures 1 and 7, the connecting member or nut 19 may be provided with oil ports 42 extending from its inner end 19a and within the shoulder 26 to pockets 43 on the peripheral surface of the member 19 between the rows of teeth 20. By means of the ports 42, rotation of the member 19 will cause oil to be forced through the pockets 43 and ports 42 to the threaded portion 18 of the shaft 10, thereby insuring the lubrication of this portion of the shaft for rotation of the member 19 upon the same.

The operation of the structure heretofore described is as follows: When the speed of rotation of the motor vehicle engine or other source of power, and therefore of the clutch hub 15, is equal to or exceeds that of the shaft 10, the connecting member or nut 19 will travel on the threads 18 of the shaft 10 to the left (Figure 1). This movement is assured by two factors. First, the friction drag between the friction drag washer or ring 31, rotating with the clutch hub 15, and the connecting member 19, gives the connecting member a positive frictional tendency to rotate with clutch hub 15, thereby causing it to screw itself upon the threads 18, entirely independent of inertia or momentum into positive driving engagement with clutch hub 15. Second, the spring 35, being of the compression type, together with the drag washer 31, tends to push the connecting member or nut toward the left or engagement limit. Movement of the connecting member 19 to the left will cause the rows of teeth 20 thereon to respectively engage the rows of teeth 21 on the clutch hub 15, thereby connecting the shaft 10 to the clutch hub 15 by a positive driving means.

Because of the fact that teeth 20 and 21 are spiral, instead of being longitudinally parallel with the axis of the shaft 10, the movement of the connecting member 19 into engagement with the teeth 21 on the clutch hub 15 will be greatly expedited, the connecting member 19 being given a bodily rotational movement in the same direction as that of the direction of rotation of the shaft 10 and clutch hub 15, but at a faster speed, due to the inclination of the teeth, until the connecting member 19 is fully engaged with the clutch hub 15.

The movement of the connecting member 19 to place the teeth 20 in full engagement with the teeth 21 upon the clutch hub, will also be expedited by reason of the fact that both rows of teeth are axially spaced and that the teeth, when in disengaged position, are axially staggered. That is to say, because of the axial staggering of the rows of teeth of the respective members, the connecting member 19 need only move one-half the axial distance to obtain full engagement which would be necessary in teeth of a like area and where the two sets of teeth are formed in single rows.

When the connecting member 19 travels to the left to effect a driving engagement between the teeth, there is ordinarily a likelihood of the occurrence of a shock or jar when the connecting member reaches the end of its movement and a positive connection is established. However, by the provision of the fluid cushion means comprising the annular groove 23 and the projection 26, all possibility of such a shock or jar is eliminated. The provision of the spring 27 in the grooves 23, if necessary, also assists in preventing any shock.

When the speed of rotation of the shaft 10 or elements connected therewith exceeds that of the source of power, and therefore the clutch hub 15, the increased rotation of the shaft will cause the connecting member 19 to move to the right, that is, to the position shown in Figure 1. Such movement will be against the action of the friction drag ring 31 and its associated spring 35 and will result in the disengagement of the teeth 20 upon the connecting member from the teeth 21 within the clutch hub. The friction drag between the ring 31 and the connecting member 19 will tend to retard the rotation of the connecting member 19 with respect to the shaft 10 and, as a consequence, there will be a positive frictional tendency for the connecting member to turn upon the threads 18 to the right and out of engagement with the teeth 21. So long as the shaft 10 is over-running the clutch hub 15, this tendency will be present and there will be no driving connection between the shaft and the source of power.

If a spring such as 27 is provided in the annular groove 23 of the abutment nut 22, such a spring will urge the connecting member 19 to the right when the spring 27 is compressed and this spring therefore assists the starting movement of the connecting member from its positive drive connecting position to its inoperative or overrunning position. However, even if the spring 27 is not provided, it is found, in actual practice, that the connecting member 19 will readily move to overrunning position, or to the right.

My invention also comprehends the provision of means to enable the shaft 10 to be locked into a positive bi-directional driving connection with the clutch hub 15 or other source of power. This means comprises a toothed collar 50 slidable upon splines 10a upon the shaft 10 and adjacent the outer end of the clutch hub 15. By movement of the collar 50 to the left into engagement with the teeth 40 formed upon the interior of the outer end of the clutch hub 15, the shaft 10 will be locked to the clutch hub 15, regardless of the position of the connecting member 19. To effect a very ready engagement of the teeth 52 upon the collar 50 with the teeth 40, alternate teeth of the teeth 52 upon the collar may be cut back on their inner ends as indicated at 53. Also, the number of teeth 40 within the clutch hub 15, is but half that upon the collar 50. By this well known arrangement, movement of the collar 50 to the left results in readier engagement with the teeth 40, while the shaft 10 or clutch hub 15 are rotating.

The collar 50 is provided with a circumferential groove 55 in its outer surface and directly behind the teeth 52. Within the quill or sleeve 56, fixed to the casing 11, there is positioned a sleeve 57 (Figures 4 and 9) which includes an arcuate extension 58 at its inner end provided with an internal shoulder 59 which engages in the groove 55 of the collar 50. The sleeve 57 is provided with an arm 60 projecting through a slot 61 in the quill 56, which arm is engaged by one arm of a bell crank lever 62 mounted to rock upon a shaft 63 extending across and journaled in the clutch housing 11. A manually operated connection 64 is secured to an outer arm 62a on the shaft 63 and extends to the dash of the vehicle.

A spring pressed ball 67 is positioned in a socket in the shaft 10 and the surface of the bore of the collar 50 is provided with two axially spaced sockets 68, in one of which the ball 67 will be seated in each position of the collar 50. It is desirable to form the sockets 68 in two circumferential rows, each individual socket alternating with the splined grooves in the bore of the collar, since, by this arrangement, regardless of the circumferential position of the collar on the shaft 10, a pair of sockets 68 will be axially aligned with the ball 67.

It will be observed by this arrangement, the collar 50 may be moved into or out of connection with the teeth 40 of the clutch hub 15 regardless of the position of the connecting member 19. The arrangement of the shoulder 59 in the groove 55 permits collar 50 to rotate freely with respect to the shoulder.

It will be observed that my invention provides for particular relative alignment or timing of the spiral teeth or threads 18 on the shaft 10 with respect to the straight splines 10a on the shaft 10, upon which the collar 50 travels. By this alignment, together with proper timing of the teeth on the connecting member 19, inside and out, the teeth on collar 50, inside and out, and the teeth on the inside of the clutch hub, a complete timing result is accomplished, thereby automatically creating the positive alignment of all the teeth, when in driving position, which permits the locking out of free-wheeling, without feeling for mesh.

The number of external teeth 20 on the connecting member 19 must be the same or a multiple of the internal teeth thereon, which latter mesh with the threads 18 on the shaft 10.

This alignment is to be made at the lead, on the driving or right-hand end of the spiral thread on the shaft. For instance, should one look from the driving end, the leads of all the threads and splines would be in straight diametrical and longitudinal alignment.

It will also be noted that I provide a device wherein when the hub attempts to overrun the shaft, a frictional means which tends to rotate a connecting member faster than the shaft, causes the connecting member to travel to the left in Figure 1 toward its driving or engagement limit. This construction also insures that when the shaft overruns the hub, this same frictional means tends to hold the connecting member at a lower rate of speed than the shaft, thereby causing the connecting member to return to its disengaging limit, because of its spiral thread connection with the shaft.

Means is also provided to accomplish an automatic alignment of the teeth on the clutch hub and the teeth on the lockout collar, when the connecting member is in driving position. This arrangement permits the locking-out of freewheeling without feeling for mesh, as is necessary with all present units.

It will be understood that the invention is not limited to the details of construction shown in the drawings and described in the specification and that the examples of the use of the device which have been given do not include all of the uses of which the device is capable; also, that the phraseology employed in the specification is for the purpose of description and not of limitation.

I claim:

1. The combination of a rotatable shaft element, an element rotatable with respect to said shaft element, a drive connecting member, means on one of said elements to move said member to connect said elements in driving relation in accordance with the difference in speed of rotation of said respective elements, said means being so arranged with respect to said rotatable elements as to move said member into drive connecting relation with a bodily rotational movement faster than that of said shaft element.

2. The combination of a rotatable shaft element, an element rotatable with respect to said shaft element, a drive connecting member, means on one of said elements to move said member to connect said elements in driving relation in accordance with the difference in speed of rotation of said respective elements, said means being so arranged with respect to said rotatable elements as to move said member into drive connecting relation by a bodily circumferential and linear movement with respect to the axis of said elements, such circumferential movement of said member being in the same direction as the rotational movement of said elements.

3. The combination of a rotatable shaft, a member rotatable on said shaft, said shaft being provided with a thread, a connecting member engaging said thread, said first member being provided with spirally extending teeth arranged at an angle different from that of the angle of said thread, and said connecting member being provided with teeth adapted to engage the teeth on said first member, said connecting member being adapted to be moved with respect to said first member in accordance with the difference in speed of rotation of said shaft and said first member.

4. The combination of a rotatable shaft, a member rotatable on said shaft, a connecting member threaded on said shaft to connect said first member and shaft in accordance with the difference in speed of rotation of said first member and shaft, said first and said connecting members being respectively provided with spirally extending teeth to cause said connecting member to move into engagement with said first member circumferentially with respect to said shaft and in the same direction as the direction of rotation of the latter.

5. The combination with a rotatable shaft, a member rotatably mounted on said shaft, a connecting member mounted on said shaft and adapted to be moved to connect said shaft and said first member in accordance with the difference in speed of rotation of said shaft and said first member, of a hydraulic cushioning means to resist inward movement of said connecting member with respect to said first member comprising a chamber in one of said members, means to force a cushioning fluid into said chamber and means on the other of said members to close said fluid supply chamber against egress of fluid therefrom upon the inward movement of one of said members with respect to the other.

6. The combination of a rotatable shaft, a member rotatable on said shaft, a connecting member threaded on said shaft to connect said first member and said shaft in accordance with the difference in speed of rotation of said first member and said shaft, said first member and said connecting member being respectively provided with axially spaced sets of teeth, the respective axially spaced sets of teeth on said members being in axially staggered relation when in disengaged position.

7. The combination of a rotatable shaft, a member rotatable on said shaft, a connecting member threaded on said shaft to connect said first member and said shaft in accordance with the difference in speed of rotation of said first member and said shaft, said first member and said connecting member being respectively provided with axially spaced sets of spirally arranged teeth to cause said connecting member to move into engagement with said first member circumferentially of said shaft and in the same direction as the direction of rotation of the latter, the respective axially spaced sets of teeth on said members being in axially staggered relation when in disengaged position.

8. The combination of a rotatable shaft, a member rotatable on said shaft, a connecting member threaded on said shaft to connect said first member and said shaft in accordance with the difference in speed of rotation of said first member and said shaft, said first member and said connecting member being respectively provided with spirally arranged teeth, a second set of teeth on said first member, and a toothed member slidable on said shaft to connect said shaft and said first member regardless of the position of said connecting member.

9. The combination of a rotatable shaft, a driving clutch hub mounted to turn freely about the axis of said shaft and provided interiorly with two annular sets of teeth in longitudinal alignment, a nut having inner and outer teeth in diametrical alignment engaging a thread on the shaft within the clutch hub and provided with teeth adapted to mesh with one set of teeth on the clutch hub, a spring mounted to rotate with the hub and acting to effect engagement of one of said sets of teeth and the nut and to permit disengagement of such teeth when the speed of rotation of the shaft exceeds that of the clutch hub, a toothed member splined to the shaft and adapted to mesh with the second set of annular teeth on the clutch hub, a member extending longitudinally of the shaft and adapted to position said toothed member in engagement with or at one side of the coacting teeth on the clutch hub, and means for automatically locking said toothed member in either of said positions.

10. The combination of a rotatable shaft, a driving clutch having its hub mounted to turn freely about the axis of said shaft and provided with two sets of annular teeth, a nut engaging a thread on the shaft and provided with teeth adapted to mesh with one of the sets of annular teeth of the clutch hub, a spring engaging a frictional drag washer slidably mounted to rotate with the hub, said spring forcing longitudinal movement of the washer into frictional engagement with said nut tending to cause said nut to rotate with the hub, forming the means to effect an engagement of said teeth on the nut and hub, and to permit disengagement thereof when the speed of rotation of the shaft exceeds that of the clutch hub, a toothed member splined to the clutch hub, and a member for moving said toothed member to effect engagement of the teeth thereof with the second annular set of teeth on said clutch hub.

11. The combination of a rotatable shaft, having two sets of teeth thereon, each set having the same number of teeth, the teeth of one of said sets being parallel with the axis of the shaft and the teeth of the other set being spiral, said sets of teeth being in diametrical and longitudinal alignment, a driving clutch hub provided with two sets of teeth, each set of the same number as the number in one of said sets on said shaft or a multiple thereof, said hub being mounted to turn freely about the axis of said shaft, a connecting member having inner and outer teeth in diametrical alignment, said inner teeth engaging the spiral teeth on said shaft and the said outer teeth being adapted to mesh with one of the sets of teeth on said clutch hub, and a member having inner and outer teeth in diametrical alignment, said inner set of teeth engaging the axially extending teeth of said rotatable shaft and said outer teeth being adapted to mesh with the second set of teeth on said clutch hub, and means to selectively engage said last named member with the teeth on the clutch hub.

12. The combination of a rotatable shaft, a member rotatable on said shaft, a connecting member threaded on said shaft to connect said first member and shaft in accordance with the difference in speed of rotation of said first member and shaft, said first member and said connecting member being respectively provided with spirally extending teeth to cause said connecting member to move into engagement with said first member circumferentially with respect to said shaft and at a faster bodily rotation than that of said shaft.

13. The combination of a rotatable shaft, a toothed driving clutch hub mounted to turn freely about the axis of said shaft, a nut including teeth engaging a thread on the shaft, a frictional drag washer slidably mounted to rotate with the hub, a spring to longitudinally force said washer into frictional engagement with said nut, tending to cause said nut to rotate with the hub to effect an engagement of said teeth on the nut and hub and to permit disengagement thereof when the speed of rotation of the shaft exceeds that of the clutch hub, and manually operable means for effecting positive engagement between the shaft and clutch hub independent of said nut.

LEVI THOMAS PRITCHARD.